United States Patent Office 2,770,655
Patented Nov. 13, 1956

2,770,655

PROCESS FOR THE PRODUCTION OF BRANCHED CARBON CHAIN ALDEHYDES

Karl Mönkemeyer, Marl, Kreis Recklinghausen, Germany, assignor to Chemische Werke Huls Aktiengesellschaft, Marl, Kreis Recklinghausen, Germany, a corporation of Germany No Drawing. Application March 26, 1954, Serial No. 419,084

Claims priority, application Germany May 27, 1953

2 Claims. (Cl. 260—603)

It is known that alcohols can be transformed into the next higher primary alcohols by the action of carbon monoxide in the presence of certain catalysts at elevated temperatures and at high pressure. It has been tried to guide the reaction by the application of cobalt catalysts in such a way that the next higher aldehydes are formed. But the amount of the acids and higher alcohols formed was so great that the yield of aldehydes was unsatisfactory. In general, the maximum yield of aldehydes was 70%, based upon the reacted alcohol.

It has been found that by reacting aliphatic tertiary alcohols with carbon monoxide and hydrogen in the presence of a cobalt catalyst at high pressure and temperatures it is possible to obtain in practically quantitative yield the next higher aldehydes if the reaction is carried out in the presence of at least 5 percent of water, based upon the weight of the starting alcohol. The cobalt catalysts are preferably used in the form of an aqueous solution of their salts. The required amount of water to prevent completely the formation of alcohol, that is, the hydrogenation of the aldehyde formed, can be up to 50% or more.

The process is carried out in known manner under high pressure, preferably at 200 to 1000 atmospheres, absolute and at temperatures of 100 to 300° C., preferably at 180 to 250° C.

Suitable aliphatic tertiary alcohols are e. g. tertiary butanol, dimethyl-ethyl-carbinol, methyl-diethyl-carbinol, triethyl-carbinol, methyl-ethyl-butyl-carbinol, methyl-propyl-isopropyl-carbinol, diethyl-isopropyl-carbinol, diethyl-butyl-carbinol, ethyl - propyl - isopropyl - carbinol, ethyl-di-isopropyl-carbinol.

The catalysts may contain cobalt in oxidized or reduced form or in any compound of organic or inorganic nature, such as the formate, acetate, propionate, butyrate, 2-ethyl butyrate, 2-ethyl caproate, laurate, myristate, palmitate, stearate, oleate, benzoate, phthalate, naphthenate, sulfate of cobalt, with and without a carrier which may be solid, liquid or gaseous.

*Example*

1000 parts by weight of tertiary butanol are mixed with 100 parts by weight of water and 30 parts by weight of cobalt acetate and treated at 195° C. and at 300 atmospheres, absolute with a mixture of carbon monoxide and hydrogen in a ratio of 2:3 in a stainless steel 2 liter autoclave with magnetic agitation. The pressure is maintained constant by controlling the introduction of the carbon monoxide-hydrogen mixture. After cooling and releasing the compressed gas the entire product is distilled at a temperature of 78–82° C. The isovaleraldehyde formed is isolated in the form of its bisulfite addition compound or by means of aldehyde ammonia, and identified. All together 104 parts by weight of isovaleraldehyde are obtained, the balance being unreacted tertiary butanol, which can again be used for the reaction.

The procedure described in the example is applicable with similar results to other tertiary aliphatic alcohols. Instead of cobalt acetate other salts of cobalt, e. g. the benzoate, phthalate, naphthenate, sulfate may be used.

I claim:

1. A process for the production of branched carbon chain aldehydes which comprises reacting an aliphatic tertiary alcohol with carbon monoxide and hydrogen in the presence of a cobalt catalyst at an elevated temperature within the range from about 100° to about 300° C. and under a pressure within the range from about 200 to about 1000 atmospheres absolute in the presence of water within the range from about 5 to about 50 percent, based upon the weight of the starting alcohol.

2. Process according to claim 1 in which the cobalt catalyst is in the form of an aqueous solution of a salt of an organic acid.

References Cited in the file of this patent

UNITED STATES PATENTS 2,457,204    Brooks _____ Dec. 28, 1948